Patented Nov. 11, 1941

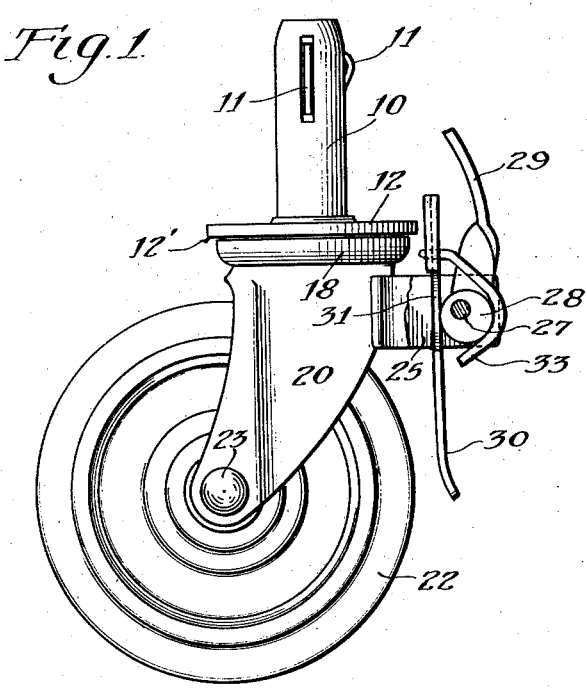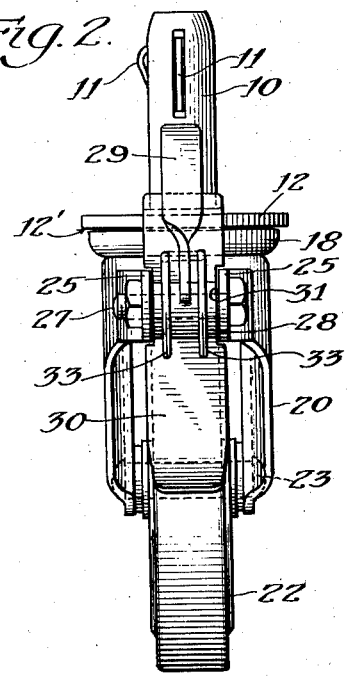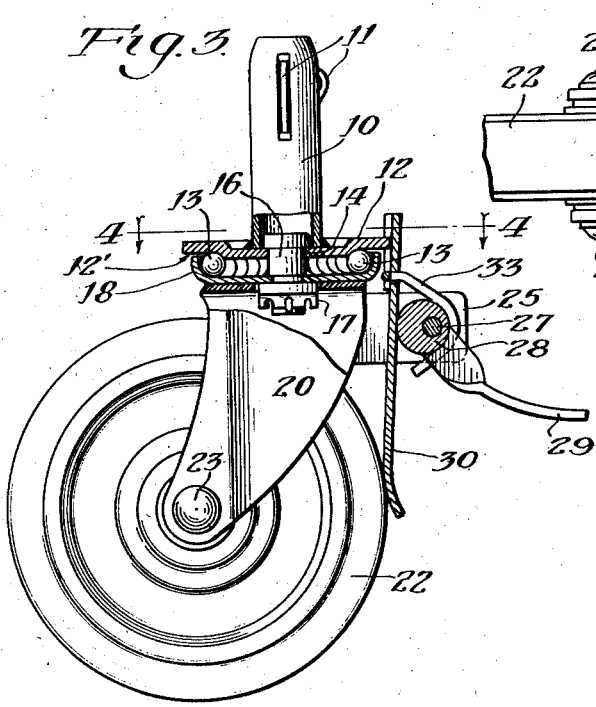

2,262,433

UNITED STATES PATENT OFFICE 2,262,433

CASTER

Reinhold A. Uecker, David E. Beatty, and Ingar G. Rambo, Wauwatosa, Wis., assignors to Safway Steel Scaffolds Co. of Wisconsin, Wauwatosa, Wis., a corporation of Wisconsin Application May 16, 1939, Serial No. 273,928

3 Claims. (Cl. 16—35)

This invention relates to casters of the type having a brake thereon.

In movable supporting structures, such as scaffolds employing casters, it is necessary to have a secure foundation which will not move while men are at work on the structure.

One such caster is described in the U. S. Patent to Ingar G. Rambo and Fred H. Graser, Number 2,126,811, issued August 16, 1938. While the Rambo-Graser caster presents definite advantages, it has been found desirable to have a larger wheel than would be practical in that structure.

One object of the present invention is to provide a caster which may be set to prevent the wheel from rolling and from swiveling.

Another object is to provide a caster which will support a scaffold firmly in any position.

A further object is to provide a caster having an improved braking arrangement.

Another object of the invention is to provide a scaffold caster which may be set to prevent all movement without elevating the wheel off its foundation.

Other objects are to increase the strength of scaffold casters, to reduce the cost of manufacture, and to simplify generally the caster structure.

Other objects will be apparent from the following description which taken in connection with the accompanying drawing, illustrates one form of caster falling within the scope of the present invention.

According to the present invention a caster is provided with a base plate about which the caster swivels on a vertical axis, and a brake which simultaneously contacts the base plate and the caster wheel to prevent rotation of the wheel on its axle and swiveling of the caster about the vertical axis.

In the drawing:

Fig. 1 is a side elevational view of the caster with the brake in off position and with certain parts thereof being shown in cross-section;

Fig. 2 is an end elevational view of the caster shown in Fig. 1;

Fig. 3 is a side elevational view of the caster partly in section to more clearly illustrate certain other parts, and shows the brake in set position; and Fig. 4 is a cross-section on the line 4—4 of Fig. 3, looking in the direction of the arrows.

Referring to the drawing in which like numerals indicate like parts throughout the several views, the caster shown has a shank 10 which fits within the post of the scaffold in a manner shown in the Rambo-Graser patent, supra, and is held therein by spring retainers 11—11 which are also shown in detail in the Rambo-Graser patent.

The shank 10 is welded to a base plate 12 which has an offset portion 12' to form the inner guide for a plurality of ball bearings 13. The base plate 12 has an aperture 14 therethrough, concentric with the ball bearings 13 through which the shank of a small headed bolt 16 passes. The head of the bolt 16 lies within the shank 10 and is retained therein by the upper surface of the plate 12 against which the head abuts.

The bolt 16 threaded at the lower end to receive a nut 17, centers and retains a cup-like ball race 18. The ball bearings 13 form the support between the base plate 12 and the race 18 and reduce friction in swiveling.

A yoke 20 is fixed to the ball race, preferably by welding, and carries a caster wheel 22 rotatably mounted on an axle 23 supported between the lower open end of the yoke 20. The axle 23 is offset from the center of the shank 10 so that the wheel will readily swivel on the bolt 16.

A pair of arms 25—25 are formed on the yoke 20, one arm on each leg of the yoke, and on the opposite side of the shank 10 from the axle 23. The outer ends of the arms 25 are joined by a pivot 27 which carries an eccentric cam 28. The cam 28 is actuated by a lever 29 which rotates the cam about the pivot 27.

A brake shoe 30 is supported by guide notches 31 between the arms 25—25 and is adapted to contact both the caster wheel 22 and the outer rim of the base plate 12. The shoe 30 is actuated into engagement with the caster wheel 22 and the plate 12 by a combined translatory and pivotal movement by the cam 28, and is withdrawn from braking position by a pair of tie arms 33—33 which are fixed to the brake shoe and envelope the cam so that release of pressure of the cam 28 on the shoe 30 automatically withdraws the shoe from contact with the wheel 22 and the base plate 12.

It will thus be seen that there has been provided a caster having a brake which is safe, simple and economical which will simultaneously lock the caster wheel and prevent the caster from swiveling on its pivotal shank. It is realized that various changes and modifications may be made coming within the scope of this invention and it is not therefore desired to limit the invention to the precise form herein shown and described, but only by the scope of the appended claims.

The invention hereinbefore described is hereby claimed as follows:

1. A caster of the character described comprising, a shank, a base plate mounted on said shank, a yoke swivelly mounted from said base plate, a caster wheel rotatably mounted in said yoke, and a brake mounted for translatory and pivotal movement relative to said yoke and engageable simultaneously in frictional contact with said wheel and with the periphery of said base plate to prevent rotation of the caster wheel and swiveling of said yoke.

2. A caster of the character described comprising, a shank, a base plate mounted on one end of said shank, a yoke swivelly mounted from said base plate, a caster wheel rotatably mounted between the open ends of said yoke and adapted to swivel therewith, an arm fixed on each side of said yoke, a pivotal member mounted between said arms, a brake mounted for translatory and pivotal movement between said arms and engageable in frictional contact with said base plate and said caster wheel to stop simultaneously rotation of the wheel about its axle and swiveling of the yoke, and a cam member mounted on said pivotal member and engageable with said brake to actuate the same.

3. A caster of the character described comprising, a shank, a base plate mounted on one end of said shank, a yoke swivelly mounted from said base plate, a caster wheel rotatably mounted between the open ends of said yoke and adapted to swivel therewith, an arm fixed on each side of said yoke, a pivotal member mounted between said arms, a cam mounted on said pivotal member, and a brake mounted between said arms and carried by said cam, said brake being adapted for translatory and pivotal movement to engage frictionally the periphery of said base plate and said caster wheel to prevent both rotation of the wheel and swiveling of the caster.

REINHOLD A. UECKER.
DAVID E. BEATTY.
INGAR G. RAMBO.